United States Patent
Aschen et al.

(10) Patent No.: US 7,530,111 B2
(45) Date of Patent: May 5, 2009

(54) WRITE-ACCESS CONTROL SYSTEM

(75) Inventors: Sean E. Aschen, West Haven, CT (US); James R. Doran, New Milford, CT (US); Brian P. Olore, Monroe, NY (US); Christine L. Quintero, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 842 days.

(21) Appl. No.: 10/850,115

(22) Filed: May 20, 2004

(65) Prior Publication Data

US 2006/0004803 A1    Jan. 5, 2006

(51) Int. Cl.
*G06F 17/30* (2006.01)

(52) U.S. Cl. .......................... 726/27; 707/1

(58) Field of Classification Search ............ 726/27; 707/1
See application file for complete search history.

(56) References Cited

U.S. PATENT DOCUMENTS

| | | | |
|---|---|---|---|
| 5,677,851 A | 10/1997 | Kingdon et al. | |
| 6,141,759 A * | 10/2000 | Braddy | 726/14 |
| 6,345,266 B1 * | 2/2002 | Ganguly et al. | 707/1 |
| 6,581,093 B1 * | 6/2003 | Verma | 709/220 |
| 6,654,891 B1 * | 11/2003 | Borsato et al. | 726/6 |
| 6,665,674 B1 * | 12/2003 | Buchanan et al. | 707/10 |
| 6,769,011 B1 * | 7/2004 | Desrochers et al. | 709/203 |
| 7,133,833 B1 * | 11/2006 | Chone et al. | 705/7 |
| 7,213,150 B1 * | 5/2007 | Jain et al. | 713/176 |
| 2002/0083340 A1 * | 6/2002 | Eggebraaten et al. | 713/201 |
| 2002/0178026 A1 | 11/2002 | Robertson et al. | |
| 2002/0186260 A1 | 12/2002 | Young | |
| 2003/0033349 A1 | 2/2003 | Lambert et al. | |
| 2004/0059719 A1 * | 3/2004 | Gupta et al. | 707/3 |
| 2005/0080886 A1 * | 4/2005 | Croy et al. | 709/223 |
| 2005/0198501 A1 * | 9/2005 | Andreev et al. | 713/168 |
| 2006/0147043 A1 * | 7/2006 | Mann et al. | 380/270 |

* cited by examiner

*Primary Examiner*—Kambiz Zand
*Assistant Examiner*—Amare Tabor
(74) *Attorney, Agent, or Firm*—Anna L. Linne; Greenblum & Bernstein P.L.C.

(57) ABSTRACT

A method and system is provided so that requests to a first application (e.g., an LDAP directory) are routed to a second application, the second application being trusted by the first application. The second application validates the requests and sends the request to the first software application when the first application is available. Requests may be queued for processing until the first application is available so that the requests remain pending. A reply may be sent to the requester indicating the results of the request. The second software application processes authentication and validation of the request thereby relieving the first application of this function. Since the second application is a trusted application, the request to the first application may be applied with improved efficiencies increasing the overall performance of the first software application.

27 Claims, 3 Drawing Sheets

WRITE-ACCESS CONTROL SYSTEM

BACKGROUND OF THE INVENTION

1. Field of the Invention

The invention generally relates to controlling access to a software application and, more particularly, controlling access to a first software application using a second trusted application.

2. Background Description

When deploying servers (e.g., light weight directory access (LDAP) directories) in large enterprises, efficient write-access and update management become major issues. For example, in a network enterprise system, LDAP control implementations typically require that an Access Control List (ACL) for an entry be stored in that entry. The single LDAP master directory handles receiving and propagating all changes and propagating them to replica servers. LDAP master servers typically handle write requests, and replica servers typically handle read requests. In a LDAP directory with a large audience, this may result in the ACLs consuming more space than the actual data. This increase in data and the processing of the ACLs reduces the speed at which the LDAP master can process updates which, in turn, exacerbates response time and overall speed of processing. In certain situations the LDAP master becomes so busy processing incoming change requests that propagation of the changes to replicas is impacted. To accommodate processing requests, LDAP products have access control mechanisms, but they are typically very fine-grained and tend to be susceptible to overall performance degradation as demands increase. As entries in the master LDAP directory increase, performance and response times degrade.

Access to ACL lists is typically restricted to certain users or applications. Thus, granting individual users access to the ACL list is uncommon. However, if users are granted the ability to update their own data in the ACL, an ACL for the owner for each entry would have to be created. For example, if there are currently 350,000 entries, allowing each user to update their own data would necessitate doubling the number of entries in the directory, in this example, to 750,000 entries. This would create undesired overhead on the LDAP directory processing.

Thus, granting users the ability to update their own data in an ACL, for example, to permit a user the ability to update for example, phone/FAX/tieline data, may create undesirable impediments to ACL processing. However, if a solution may be implemented to avoid this undesired overhead on the master LDAP server, then updates to user data by users may be performed without undue performance degradation.

Additionally, current LDAP masters typically service all requests for ACL updates, regardless of the requestor's identity or type of modification being performed on the ACL. Authentication of the requester and validating the entitlement of the requester before permitting access to the ACL must be performed for every request. The function of validating entitlement and authenticating the requestor is a significant overhead task that is built into the traditional functions of the LDAP master which contributes to slow response times and unacceptable performance issues. Therefore, allowing increased numbers of users access to the ACL list significantly increases overhead since their accesses must also be authenticated and entitlement validated. Further, updates to a LDAP directory are typically a synchronous operation and if the attempt fails, retries are necessary to complete the update. These updates may involve significant complexity or overhead.

SUMMARY OF THE INVENTION

In an aspect of the invention, a method is provided for routing at least one request for access to a first software application to a second software application, wherein the second application is a trusted by the first software application, validating the at least one request using the second software application and sending the at least one request to the first software application in response to the at least one request being successfully validated by the validating step. The validating step reduces processing overhead of the first software application.

In another aspect of the invention, a method for reducing processing demands. The method comprises the steps of queuing at least one request for a first software application at a second software application in response to the first software application being unavailable and the second software application is trusted by the first software application. Further, the invention comprises validating the at least one request using the second application, and sending the at least one request from the second application to the first software application in response to the first application resuming availability and the at least one request being successfully validated by the validating. The validating step provides for reducing a processing overhead of the first software application.

In another aspect of the invention, a computer program product comprising a computer usable medium having readable program code embodied in the medium, the computer program product includes at least one component to route at least one request for access to a first software application to a second software application and the second application is a trusted by the first software application. The at least one component further validates the at least one request using the second software application and sends the at least one request to the first software application in response to the at least one request being successfully validated by the validating.

DETAILED DESCRIPTION OF EMBODIMENTS OF THE INVENTION

This invention is directed to a system and method for controlling access to a first software application using a second software application. The second software application is trusted by the first application. When one application trusts another it typically means that the encryption sub-system of one application has a copy of the public key of a second application which allows the first application to decrypt messages, or the like, sent by the second application. For example, lightweight directory access protocol (LDAP) requests may be intercepted and authentication and entitlement checks are performed at a LDAP proxy server prior to applying the LDAP requests to a LDAP directory. This offloading of certain functions significantly reduces the overall processing overhead on the master LDAP directory server.

Figure 1:
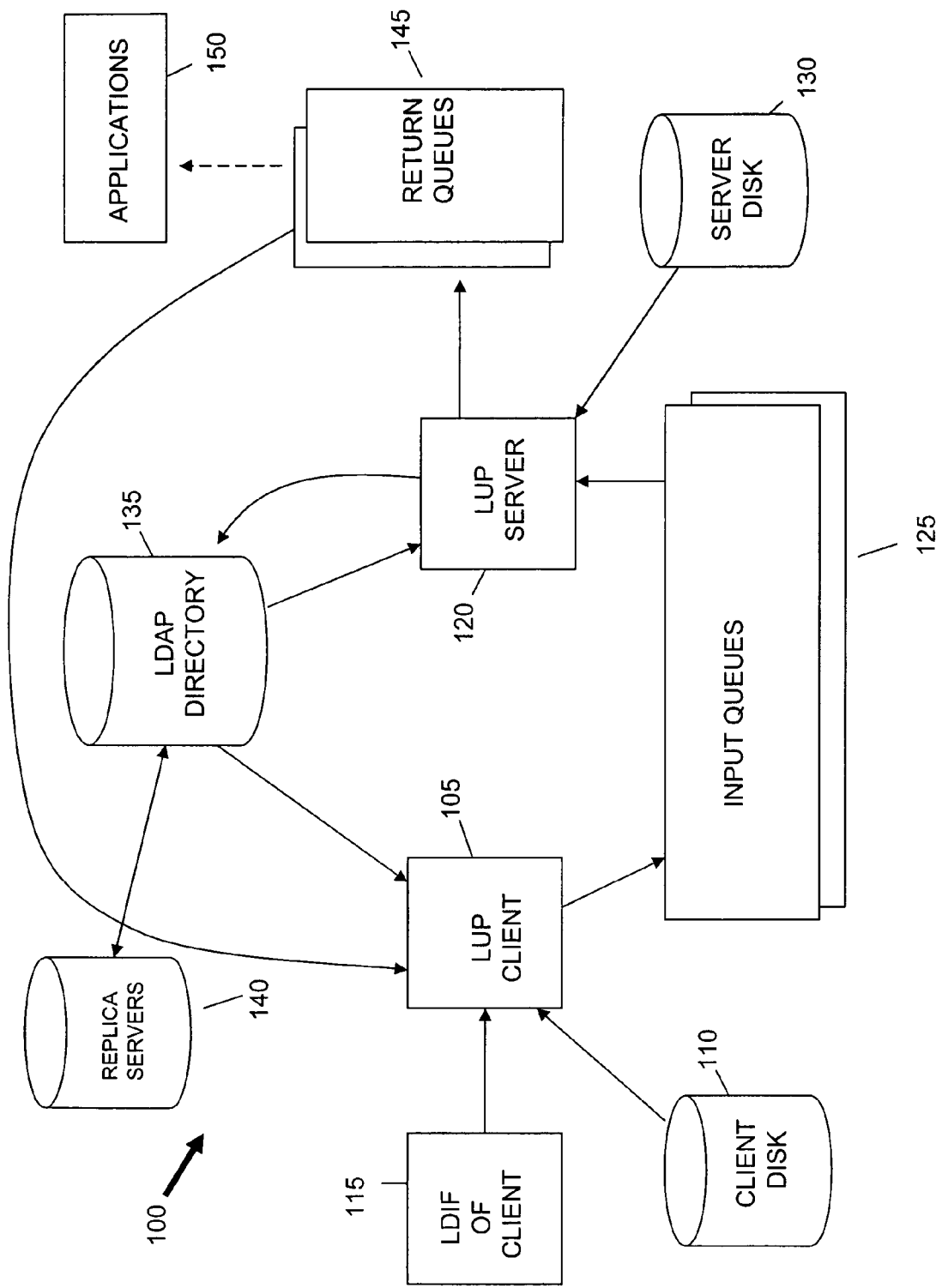
FIG. 1 is a block diagram of an embodiment of the invention.

FIG. 1 is a block diagram of an embodiment of the invention, generally denoted by reference numeral 100. The components of the invention comprise a LDAP Update Proxy (LUP) client 105 that may issue requests to update/modify LDAP entries, and may include a client disk 110 for storing client data which may be maintained in a database. The invention also comprises generally well known Lightweight Directory Interchange Format (LDIF) data 115 which may be created by the LUP client 105 when requesting an update to the LUP client's LDAP entries, a LUP server 120 for processing LDAP requests and communicates with the master LDAP directory 135 which may include a server disk 130. The master LDAP directory 135 maintains LDAP data and propagates changes to replica servers 140, and return queues 145 for queuing any replies to LUP clients 105. The invention further comprises input queues 125 for receiving and queuing one or more LDAP requests from one or more LUP clients 105. In embodiments, business area level applications 150 may also be notified by a return queue 145 of any updates to LDAP data when a LUP client 105 makes a change.

Figure 2:
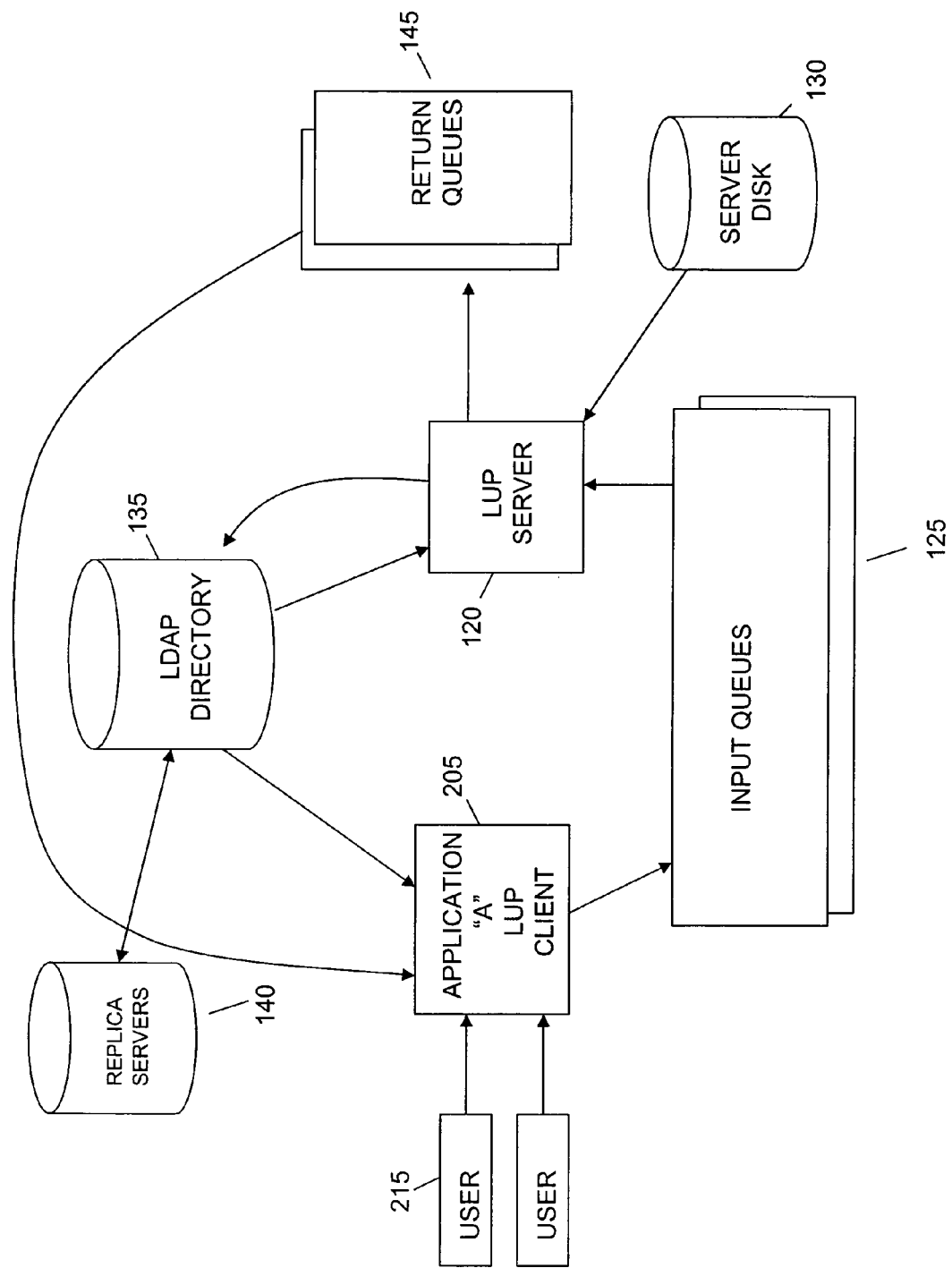
FIG. 2 is a block diagram of an embodiment of the invention.

FIG. 2 is a block diagram of a further embodiment of the invention. This embodiment provides for application level (or "business area" level) access control. That is, instead of each user 215 having the authority to update (i.e., write) their own data (e.g., phone/fax/tie line data, or the like), the invention provides for a proxy application 205 to update user data or user profile (e.g., phone/fax/tie line, or the like). In this embodiment, proxy application 205 actually updates the LDAP data on behalf of the user by generating appropriate LDIF data. In this manner, the proxy application 205 is responsible for supplying authentication/authorization when a requesting user 215 attempts to actually update their own data (or has appropriate access, e.g., when a manager updates data for others). The proxy application 205 typically is an application that is well trusted. There are many applications such as, for example, human resources, financial records, accounting, or any application where logical or physical user groups may be present, that might use the proxy application mechanism to perform LDAP updates. In embodiments, the proxy application 205 may actual be incorporated as part of the LUP server 120.

Being more specific, when a LUP client 105 or application proxy 205 issues a request to update LDAP data, the request is queued at one or more input queues 125. The LUP client 105 or application proxy 205 may use a public key of the LUP server to encrypt the request which includes LDIF data relevant to the request and may be digitally signed using the LUP client's or application proxy's private key. The LUP server 120 reads the input queue 125 and determines the identity of the client (e.g., 105 or 205). The LUP server 120 then uses public key encryption to authenticate users who place data in the input queues 125. The LUP server 120 accesses the client's (e.g., 105 or 205) public key (which may be stored on the server disk 130) and verifies the digital signature. If the verification is successful, then the LUP server 120 decrypts the client's request using the client's (e.g., 105 or 205) private key. The LUP server 120 may then check whether the client (e.g., 105 or 205) is authorized to make the requested LDAP changes. If the client has authority, then the LUP server 120 applies the LDIF to the LDAP directory 135.

The LDAP directory has it's own internal access control system which allows users to connect to the directory as different users with different access privileges. This allows for very fine grained control over who may do what to the directory, but it severely reduces the speed at which requests are processed. Traditionally, the various users and their passwords are defined in the directory, and then it is decided what operations may be performed to which entries by which users. This requires storing ownership and access information in each entry for each user. Not only is the overhead in computation time to determine if a user is allowed to perform an operation, but this scheme also inflates the directory size which makes all operations take longer. By disabling this access control system in accordance with the invention, the directory response time improves by an order of magnitude. Security and granular access control is still required in an enterprise directory, so a new access control scheme has been devised which operates outside of the directory server. Since this other application has root access to the directory, it must be kept secure.

When the LUP server 120 applies updates to the master LDAP directory 135, the changes may be made using the root-id of the LDAP master with appropriate password. This requires that the LUP server 120 is a trusted application. This access is much faster than a typical access to a master LDAP directory since the authentication and entitlement checks may no longer be necessarily performed by the master LDAP directory 135 server but rather by the LUP proxy 120. This significantly improves overall performance at the LDAP master. Each change requestor has an entry in a sub-tree of the LDAP directory. This entry contains lists of items the requestor may add, delete or modify which the LUP proxy enforces.

When the LDIF data is applied to the master LDAP directory 135, a notification may be returned via return queues 145 to the LUP client 105 or application proxy 205 as appropriate. This return notification is typically encrypted in the same fashion as incoming changes. Additionally, a notice may be placed in the return queues 145 to notify associated or pre-designated applications 150 of the LDAP changes in order to provide LDAP update notifications that occur by client or user.

The relationship of the LUP 120 to the master LDAP directory 135 changes LDAP updates from a traditionally synchronous operation to an asynchronous operation. The relationship now permits additional processing time for the LDAP master to propagate changes to the replica servers 140 since the authentication and entitlement checks are now performed by the LUP server 120. This relationship may substantially eliminate the LDAP master from becoming too busy accumulating incoming changes. The LUP server 120, incoming queues 125, and return queues 145 also provide substantial timing elasticity to smooth spikes in the master LDAP directory 135 processing by accepting requests asynchronously and holding the requests in the incoming queues until the master LDAP directory 135 is able to accept the requests when processing demands more favorably permit acceptance, and similarly, the return queues also permit asynchronous timing for returning the replies to requestors or other applications.

A client now places a request on the persistent input queues 125 and waits for a reply from the return queues 145. Additionally, if the master LDAP directory is down or impaired (e.g., crash, power outage, maintenance, etc.), the requests remain pending until they can be processed, even for extended periods. The queuing mechanisms substantially eliminate excessive client retries since requests remain pending until they can be processed.

Figure 3:
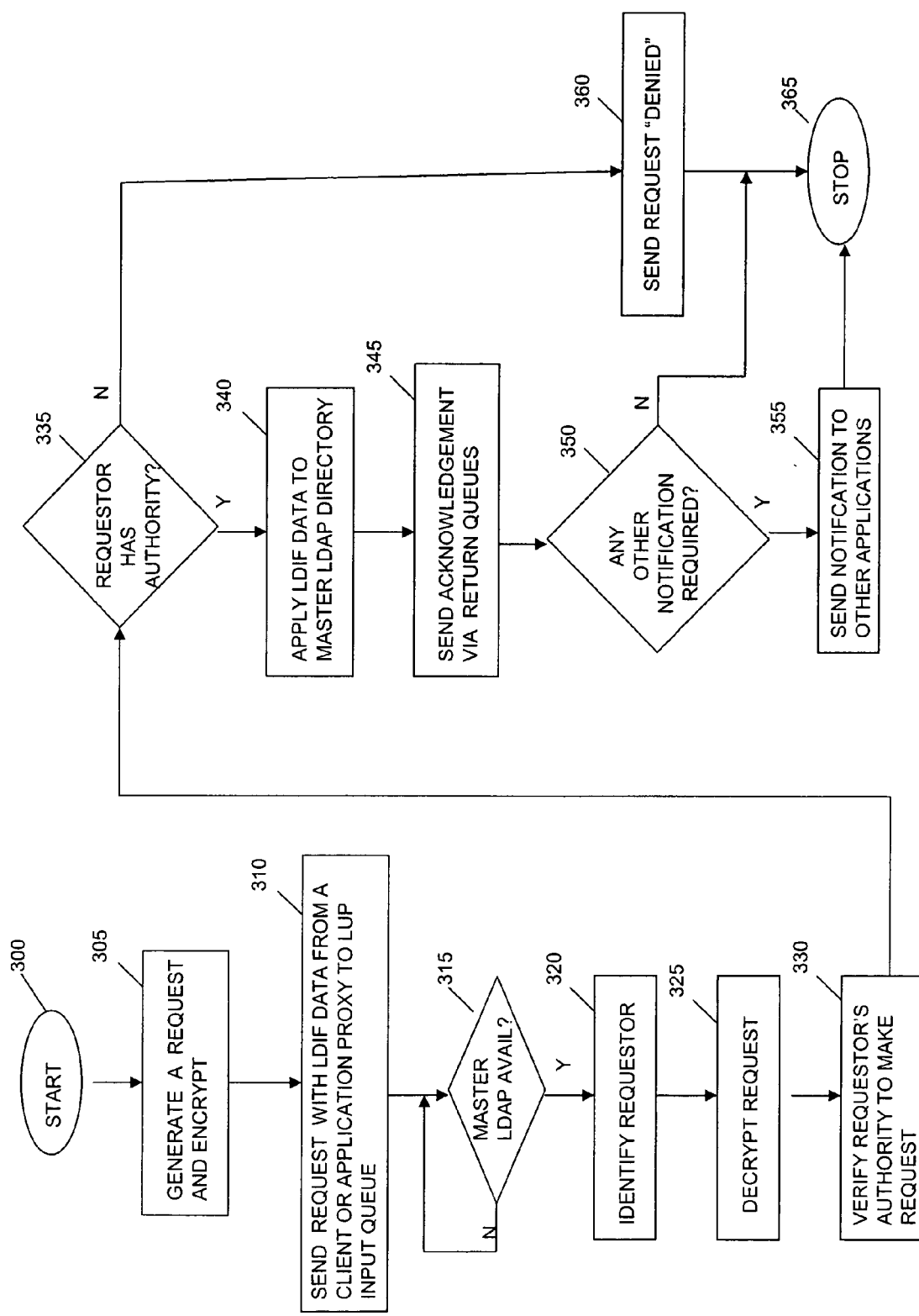
FIG. 3 is a flow chart of steps of an embodiment of the invention.

FIG. 3 is a flow diagram showing steps of an embodiment of the invention, beginning at 300. FIG. 3 may equally represent a high-level block diagram of components of the invention implementing the steps thereof. The steps of FIG. 3 may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM).

Continuing with FIG. 3, at step 305, a client or proxy application generates and encrypts a LDAP request to change or update a user profile. The request may contain LDIF data to accomplish the update. At step 310, the request with LDIF data from the client or application proxy is sent to a LUP input queue. At step 315, a check is made whether the master LDAP directory is available (e.g., on-line) and if not, the request remains queued until the LDAP master becomes available. At step 320, the LUP server de-queues the request and identifies the requestor of the request from information contained with the request, such as, for example, originating client, originating user-id, originating application id, originating network address, etc. At step 325, the request is decrypted using public keying mechanisms. At step 330, the LUP server verifies the requestor's authority to make a request, typically by checking the ACL of the appropriate LDAP directory entry.

At step 335, a decision is made whether the requestor has authority to make the request and, if not, then at step 360, a request denied message is returned to the requestor and the process stops at step 365. However, if the requestor has authority to make a request then, at step 340, the LUP server applies the LDIF data to the master LDAP directory using the root-id and associated password to effect the update. At step 345, a successful acknowledgement of the update is returned to the requester via the return queues. At step 350, a check is made whether any other notification must be sent, for example, to notify associated applications making them aware of the successful request or the effect of the request. If no other notification is needed, then, at step 365, the process ends. However, if other notifications are necessary, then, at step 355, notifications are sent to the appropriate applications indicating the update to the LDAP directory. At step 365, the process ends.

The invention provides increased efficiencies (e.g. processing overhead, database sizing, availability, and the like) to a first software application (e.g., LDAP directory) by freeing the first software application from processing functions that may be performed by a second trusted software application. The second software application acts as a proxy and accepts requests for accessing the first software application (e.g., users, clients, and application programs), and validates the request by verifying identity of the requestor and establishing entitlement rights of the requestor). The contribution of the second application creates substantial improvement to the first software applications by reducing its overall burden. The use of queuing structures also provides for asynchronous and time flexible communication mechanisms between the requesters, proxy, first application, and to other applications as warranted.

While the invention has been described in terms of embodiments, those skilled in the art will recognize that the invention can be practiced with modifications and in the spirit and scope of the appended claims.

What is claimed is:

1. A method of processing requests embodied on a computer readable storage medium, the method comprising:
    routing at least one request for access to a first software application to a second software application, wherein the second software application is trusted by the first software application;
    validating the at least one request using the second software application;
    determining whether the first software application is available to receive requests; and
    sending the at least one request to the first software application in response to the at least one request being successfully validated by the validating step, wherein the sending step includes accessing and updating the first software application using a root-id and a password for any data being updated to reduce overall processing demands on the first software application, and
    wherein the validating using the second software application reduces a processing overhead of the first software application.

2. The method of claim 1, further comprising queuing the at least one request until the first software application is available.

3. The method of claim 2, further comprising de-queuing the at least one request by the second application when the first software application is available.

4. The method of claim 3, further comprising decrypting the at least one request.

5. The method of claim 1, further comprising the step of queuing a reply for subsequent delivery.

6. The method of claim 5, wherein the reply is sent to an initial requestor of the request and the reply indicates either successful or non-successful processing of the request.

7. The method of claim 6, wherein the reply is a notice to another software application advising the another application of at least one of the request and the effect of the request.

8. The method of claim 1, wherein the first software application is a lightweight directory access protocol (LDAP) directory.

9. The method of claim 1, wherein the second software application is a lightweight directory access protocol (LDAP) proxy.

10. The method of claim 1, further comprising sending the at least one request to an application proxy, the application proxy providing identification and change information to the second software application on behalf of the requestor.

11. A method for reducing processing demands embodied on a computer readable storage medium, the method comprising:
    queuing at least one request for a first software application at a second software application in response to the first software application being unavailable, wherein the second software application is trusted by the first software application;
    validating the at least one request using the second software application; and
    sending the at least one request from the second software application to the first software application in response to the first application resuming availability and the at least one request being successfully validated by the validating, wherein the sending step includes accessing and updating the first software application using a root-id and a password to update data associated with an initial reguestor of the reguest, and
    wherein the validating step reduces a processing overhead of the first software application.

12. The method of claim 11, further comprising de-queuing the at least one request by the second software application when the first software application is available.

13. The method of claim 12, further comprising decrypting the at least one request.

14. The method of claim 13, wherein the queuing and de-queuing provides an asynchronous communication mechanism and maintains the request pending when the first software application is unavailable.

15. The method of claim 11, further comprising the steps of queuing a reply for subsequent delivery.

16. The method of claim 15, wherein the reply is sent to an initial requestor of the request and indicates either successful or non-successful processing of the request.

17. The method of claim 11, wherein the first software application is a lightweight directory access protocol (LDAP) directory and the second software application is a lightweight directory access protocol (LDAP) proxy.

18. The method of claim 11, further comprising sending a request to an application proxy, the application proxy providing identification and change information to the second software application on behalf of the requestor.

19. A computer program product comprising a computer usable medium having readable program code embodied in the medium, the computer program product includes at least one component to:
 route at least one request for access to a first software application to a second software application, wherein the first software application is accessed and urdated using a root-id and a password for any data being updated, there by reducing processing demands on the first software application, and wherein the second software application is trusted by the first software application;
 validate the at least one request using the second software application;
 determine whether the first software application is available to receive asynchronous requests; and
 send the at least one request to the first software application in response to the at least one request being successfully validated by the validating.

20. The computer program product of claim 19, wherein the at least one component queues the at least one request until the first software application is available.

21. The computer program product of claim 20, wherein the at least one component de-queues the at least one request by the second software application when the first software application is available.

22. The computer program product of claim 21, wherein the at least one component decrypts the at least one request.

23. The computer program product of claim 19, wherein the at least one component queues a reply for subsequent delivery.

24. The computer program product of claim 23, wherein the reply is sent to an initial requestor of the request indicates either successful or non- successful processing of the request.

25. The computer program product of claim 24, wherein the reply is a notice to another software application for providing information concerning the processing of the request by the first software application.

26. The computer program product of claim 19, wherein the first software application is a lightweight directory access protocol (LDAP) directory and the second software application is a lightweight directory access protocol (LDAP) proxy.

27. The computer program product of claim 19, wherein the at least one component sends a request to an application proxy, the application proxy providing identification and change information to the second software application on behalf of the requester.

\* \* \* \* \*